Aug. 23, 1966 I. R. MARCUS 3,268,736

MAGNETIC CORE SHIFT REGISTER DRIVER

Filed Aug. 20, 1962 2 Sheets-Sheet 1

INVENTOR:
IRA R. MARCUS

BY S. J. Rotondi, A. J. Dupont & J. P. Edgerton

Aug. 23, 1966 I. R. MARCUS 3,268,736

MAGNETIC CORE SHIFT REGISTER DRIVER

Filed Aug. 20, 1962 2 Sheets-Sheet 2

Inventor:
Ira R. Marcus

By: S. J. Rotondi, A. J. Dupont &
J. P. Edgerton

United States Patent Office 3,268,736
Patented August 23, 1966

3,268,736
MAGNETIC CORE SHIFT REGISTER DRIVER

Ira R. Marcus, Silver Spring, Md., assignor to the United States of America as represented by the Secretary of the Army Filed Aug. 20, 1962, Ser. No. 218,185
1 Claim. (Cl. 307—88)

The invention described herein may be manufactured and used by or for the Government of the United States of America for governmental purposes without the payment to me of any royalty thereon.

This invention relates to switching circuits and more particularly to switching of static magnetic core devices.

There is described in an application by Andrew J. Lincoln filed on April 1, 1963, Serial No. 269,825 for "Magnetic Switching Circuit" and assigned to the same assignee as this invention, a circuit which will provide the two separate phases of current pulses required to drive a two-core-per-bit magnetic shift register from a single-phase clock pulse source. As described in that application the duration of the clock pulse is not critical and may be several orders of magnitude less than the required switching pulse duration. The duration and amplitude of the switching pulse will be constant and independent of the clock pulse wave form.

It is an object of the present invention to provide an improved switching technique for a magnetic core shift register.

Another object of this invention is to provide an improved magnetic core shift register whose performance is substantially independent of variations in circuit parameters.

A further object of this invention is to provide an improved switching circuit for magnetic cores which is simple and reliable, and reduces the number of components required to perform a given function.

In accordance with the teaching of this invention a silicon-controlled rectifier is used to switch the magnetic cores.

Silicon-controlled rectifiers are high power bistable control devices with microsecond switching and small triggering requirements. These devices have a cathode, an anode, and a gating electrode. Conduction through the diode is initiated by the gating electrode, and terminated when the anode electrode potential falls below a cutoff value.

The magnetic cores are preferably those having substantially square hysteresis loops. In order to more easily understand this invention, let it be understood that when a core is driven to saturation at one polarity, it will be in the "1" state. The other saturation will be designated the "0" state. As is well known in the art, when a pulse is applied to such magnetic cores, and the core is switched from one state to another, a coil which is inductively coupled to that core will have a voltage induced therein.

The specific nature of the invention, as well as other objects, uses and advantages thereof, will clearly appear from the following description and from the accompanying drawings, in which.

Figure 1:
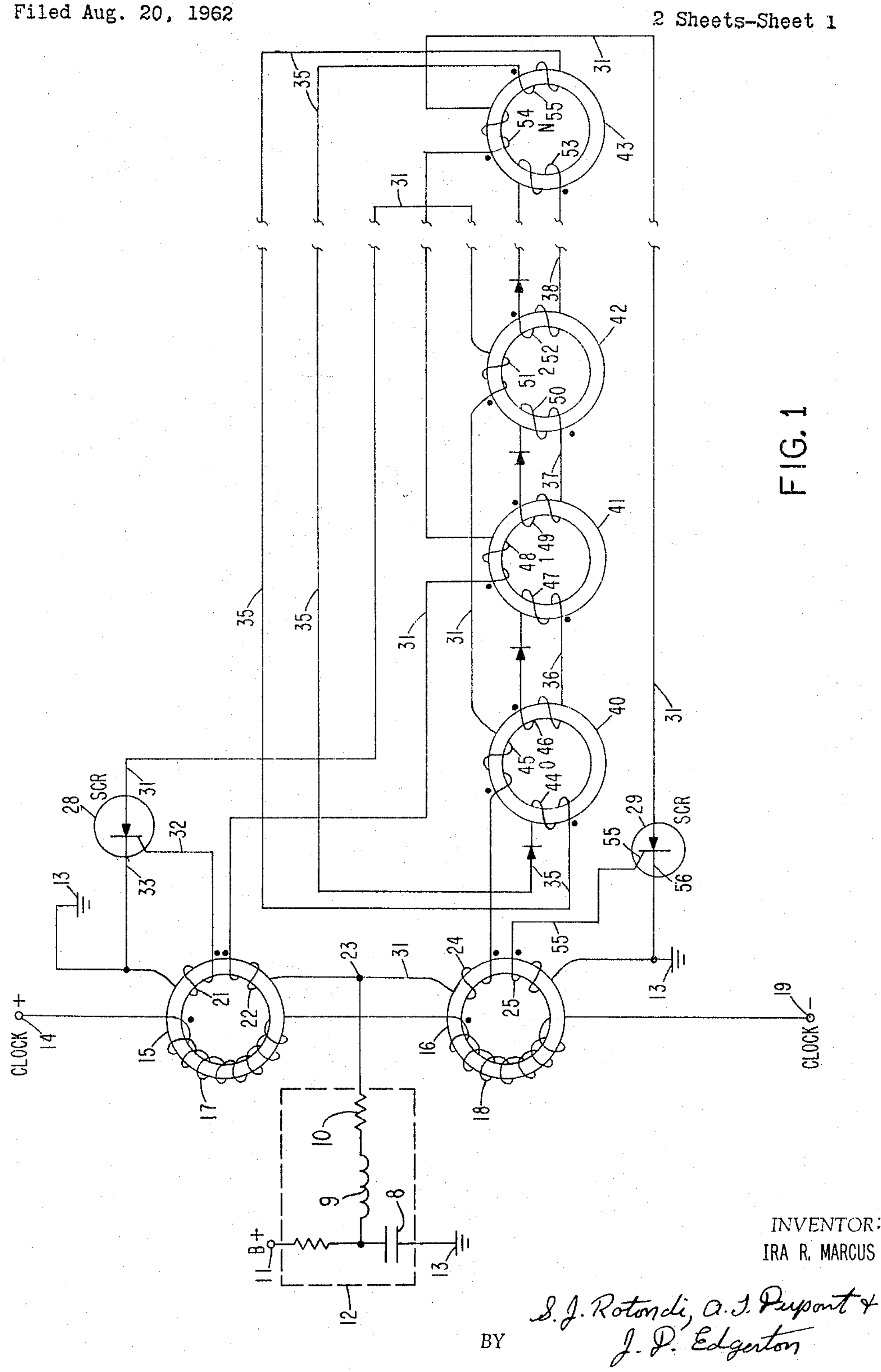
FIG. 1 illustrates schematically one embodiment of this invention.

Referring to FIG. 1, there is shown an embodiment of the invention where a sequential switching of cores is achieved with a unipolar clock pulse. The circuit comprises a direct current supply applied at 11 to a pulse forming network 12 which is grounded at 13. Unipolar clock pulses are applied between the terminals 14 and 19. These clock pulses are coupled to the cores 15 and 16 through drive windings 17 and 18. It will be assumed as a convention that positive pulses applied to the dot side of a core winding will tend to switch the core to the zero state. Therefore, positive clock pulses applied at 14 will tend to switch both the cores 15 and 16 to the zero state. Additionally, core 15 has an output winding 21 and an input winding 22. Similarly, the core 16 has an input winding 24 and an output winding 25. The input windings 22 and 24 are connected in parallel to the pulse shaping network 12 at 23.

Associated with each of the cores 15 and 16, are silicon control rectifiers 28 and 29. Silicon control rectifier 28 has an anode connected to a line 31, a control electrode connected to line 32, and a cathode electrode connected to line 33. Silicon control rectifier 29 has an anode electrode connected to line 31, a control electrode connected to line 55, and a cathode electrode connected to line 56.

In the embodiment shown in FIG. 1, the cores 15 and 16 are used to drive a shift register represented by cores 40, 41, 42, and 43. The core 40 has an input winding 44, a drive winding 45, and an output winding 46. Cores 41, 42, and 43 have respectively, input windings 47, 50, and 53, drive windings 48, 51, and 54, and output windings 49, 52 and 55. The output winding 46 of the first core 40 is coupled to the input winding of the second core 41 by lead 36. In the same fashion core 41 is coupled to core 42 by lead 37 and core 42 is coupled to core 43 by lead 38. The output winding 55 of the last core 43 is coupled to the input winding 44 of the first core 40 by lead 35. The cores 40 to 43 form a conventional shift register and the polarity of the winding is represented by the conventional dots.

The operation of the circuit shown in FIG. 1 will now be described.

Initially, one of the cores 15 or 16 is preset to the "1" state of saturation, and the other core is preset to the "0" state of saturation. Likewise, all of the cores 40 to 43 are preset to the "0" state with the exception of one core, ordinarily the first, 40 in this case, which has been set to the "1" state of saturation.

Since it is assumed that a positive pulse applied to the dot side of a core winding tends to switch the core to the "0" state, then a core going from the "1" state to the "0" state produces a positive pulse at the dot side of a coupled winding. Also, a positive pulse applied to the non dot side of a winding would tend to switch the core to the "1" state.

A first positive pulse applied to the terminal 14 will tend to switch the cores 15 and 16 to the "0" state. Assuming the core 15 was preset to the "1" state, it will switch from the "1" state to the "0" state, producing a positive pulse in its output winding 21, which is conducted by lead 32 to the control electrode of silicon control rectifier 28. This pulse triggers rectifier 28 into conduction. The rectifier 28 will continue to conduct until its anode voltage has dropped below cutoff. With rectifier 28 conducting, capacitor 8 will discharge through inductor 9, resistor 10, input winding 24 of core 16, drive windings 45 and 51 of cores 40 and 42, and silicon rectifier 28, to ground 13. When the voltage on capacitor 8 has discharged below the cutoff value of rectifier 28, conduction through the rectifier stops.

Capacitor 8 in the process of discharging through silicon control rectifier 28 has accomplished the following. The positive pulse applied to the non dot side of winding 24 of core 16 has switched the core from the "0" to the "1" state of saturation. The circuit parameters are so arranged that the ampere-turns produced by winding 24 due to the capacitor discharge, exceeds the ampere-turns produced in the winding 18 due to the clock pulse applied at 14. In this manner the winding 24 predominates over the winding 18 and the core 16 is switched to the "1"

state. The positive pulse applied to the dot side of winding 45 of core 40 tends to drive them to the "0" state of saturation. The pulse applied to the winding 51 of core 42 has no effect since it was already in the "0" state. Core 40, however, switching from the "1" to the "0" state produces a positive pulse in its output winding 46 which is coupled to the non dot side of the input winding 47 of core 41. This will switch the core 41 from the "0" to the "1" state of saturation. The pulse induced in the coil 49 of core 41 will not be coupled to the core 42 due to the diode in line 37. Obviously, the path including coils 22, 48, and 54 has been open during this cycle due to silicon control rectifier 29 being cut off.

The next clock pulse applied at terminal 14 substantially repeats the process. This time the core 16 is switched from the "1" to the "0" state causing silicon control rectifier 29 to conduct. Capacitor 8 then discharges through coils 22, 48, and 54, and silicon control rectifier 29, to ground 13. The core 15 is switched to the "1" state, and the "1" state of core 41 is transferred to core 42. The cycle is repeated for succeeding clock pulses.

The time constant of the pulse shaping circuit 12 must be less than the pulse repetition rate of the clock pulses applied at 14 in order that the capacitor 8 may be charged before the succeeding clock pulse.

Figure 2:
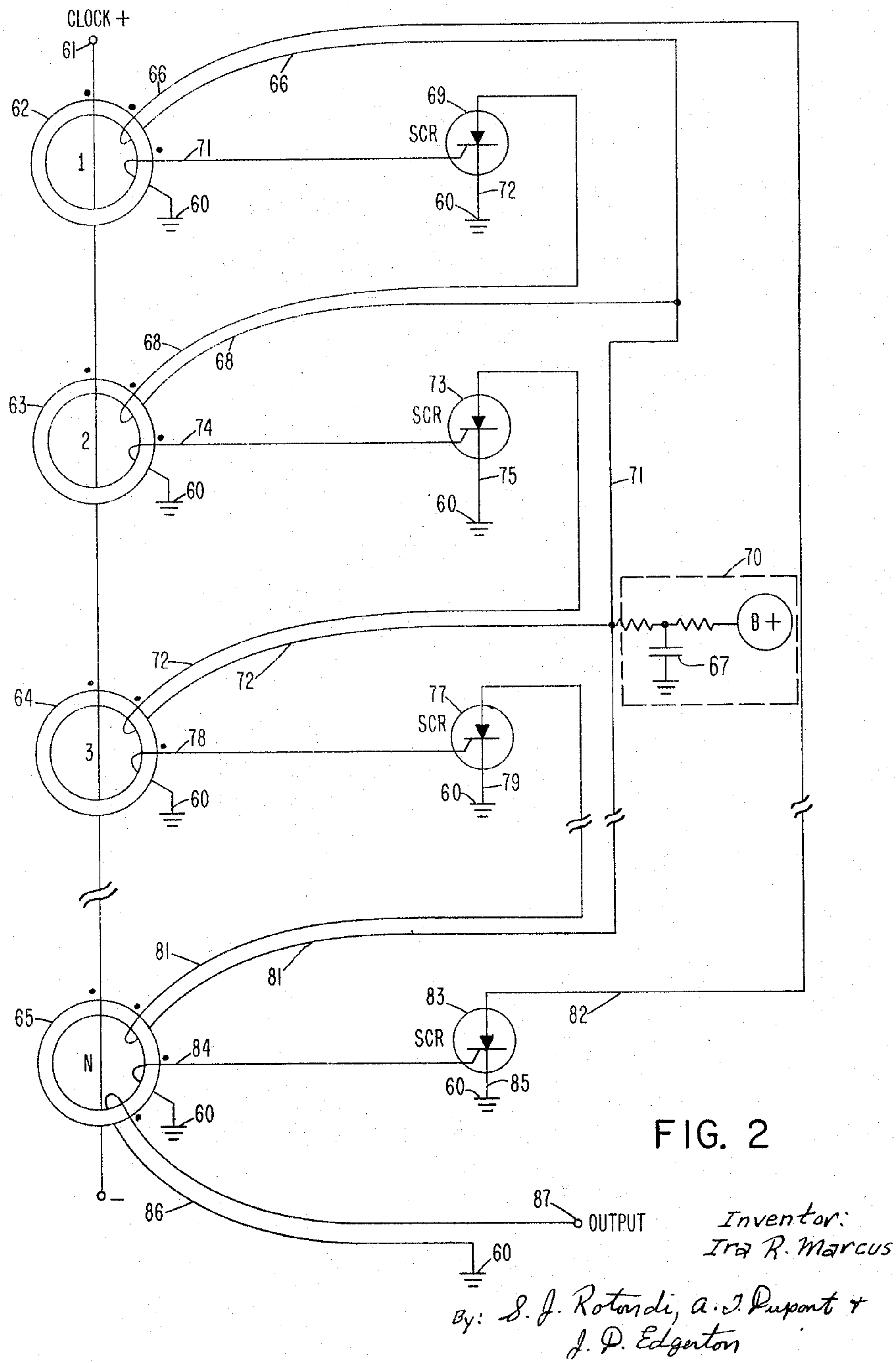
FIG. 2 represents schematically a second embodiment of this invention.

Referring now to FIG. 2, there is shown another embodiment of this invention, which will produce an output pulse after a predetermined number of input pulses.

Clock pulses are applied at 61 to a series of cores 62, 63, 64, and 65. These cores are preset to the same state of saturation, except one core which is to the opposite state. Here it will be assumed the cores 63, 64, and 65 are in the "0" state, and the core 62 is in the "1" state. Following the same convention established in connection with FIG. 1, the first positive clock pulse applied at 61 will tend to switch all the cores to the "0" state of saturation. Only core 62 will switch, producing a positive pulse in line 71. This positive pulse is applied to the control electrode of silicon control rectifier 69 and it begins to conduct. Capacitor 67 of pulse forming network 70 discharges through line 71, winding 68 of core 63, and silicon control rectifier 69 to ground 60. The positive pulse applied to the non dot side of winding 68 of core 63 switches the core 63 from the "0" to the "1" state. The circuit is designed so that the ampere-turns produced in the core 68 is sufficient to predominate over the ampere-turns produced by the clock pulses supplied to terminal 61. The switching of core 63 from the "0" to the "1" state produces a negative pulse on the dot side of winding 74 which does not trigger silicon control rectifier 73.

The next clock pulse applied to terminal 61 substantially repeats the process. The core 63 is switched from the "1" state to the "0" state, producing a positive pulse on winding 74 which triggers silicon control rectifier 73. Capacitor 67 discharges through winding 72 of core 64, switching the core 64 from the "0" to the "1" state of saturation.

When the last core 65 is switched a positive pulse is induced in winding 84 triggering silicon control rectifier 83. Capacitor 76 of pulse-forming network 70 discharges through winding 66 of core 62, and silicon control rectifier 83. This switches the core 62 to the "1" state and the circuit is in a condition to repeat the cycle. An output winding 86 is coupled to the last core 65, and produces an output pulse at terminal 87 for every *n* clock pulse, where *n* is the number of cores.

It will be apparent that the embodiments shown are only exemplary and that various modifications can be made in construction and arrangement within the scope of the invention as defined in the appended claim.

I claim as my invention:

A magnetic core shifting switch comprising:

(a) a first and a second magnetic core, (b) said first core in a first state of saturation, and said second core in a second state of saturation, (c) a first and a second silicon control rectifier, each of said rectifiers having an anode, a cathode, and a control electrode, (d) pulse forming means connected to said anode electrodes, (e) said control electrode of said first rectifier connected to said first core, and said control electrode of said second rectifier connected to said second core, (f) said first core also connected to said anode of said second rectifier, and said second core also connected to said anode of said first rectifier, (g) means to simultaneously drive said first and said second cores to said first state of saturation.

References Cited by the Examiner

UNITED STATES PATENTS

| | | | |
|---|---|---|---|
| 3,113,296 | 12/1963 | Perry | 307—88 |
| 3,132,294 | 5/1964 | Foote | 307—88 |
| 3,171,101 | 2/1965 | Hounsfield | 340—174 |

BERNARD KONICK, *Primary Examiner.*

M. E. GITTES, *Assistant Examiner.*